United States Patent
Nanu et al.

(10) Patent No.: US 10,148,943 B2
(45) Date of Patent: Dec. 4, 2018

(54) IMAGE ACQUISITION DEVICE AND METHOD BASED ON A SHARPNESS MEASURE AND AN IMAGE ACQUISTION PARAMETER

(71) Applicant: FotoNation Limited, Galway (IE)

(72) Inventors: Florin Nanu, Bucharest (RO); Alexandru Malaescu, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 15/231,436

(22) Filed: Aug. 8, 2016

(65) Prior Publication Data
US 2018/0041754 A1    Feb. 8, 2018

(51) Int. Cl.
*H04N 5/232*    (2006.01)
*H04N 17/00*    (2006.01)
(Continued)

(52) U.S. Cl.
CPC ........... *H04N 17/002* (2013.01); *G06T 5/003* (2013.01); *H04N 5/23212* (2013.01);
(Continued)

(58) Field of Classification Search
CPC ........... H04N 5/23212; H04N 5/23219; H04N 5/2356; H04N 5/144; G06T 5/003;
(Continued)

(56) References Cited

U.S. PATENT DOCUMENTS

| 5,912,676 A | 6/1999 | Srinivasa et al. |
| 6,864,474 B2 * | 3/2005 | Misawa ................ G02B 7/36 250/201.4 |

(Continued)

FOREIGN PATENT DOCUMENTS

| EP | 2037320 A1 | 3/2009 |
| WO | 2008/014472 A2 | 1/2008 |

(Continued)

OTHER PUBLICATIONS

"Facial Deblur Inference using Subspace Analysis for Recognition of Blurred Faces", Masashi Nishiyama et al (http://research-srv.microsoft.com/pubs/140476/Final%20Version.pdf).

(Continued)

*Primary Examiner* — Ngoc-Yen Vu

(57) ABSTRACT

A method for acquiring an image comprises acquiring a first image frame including a region containing a subject at a first focus position; determining a first sharpness of the subject within the first image frame; identifying an imaged subject size within the first image frame; determining a second focus position based on the imaged subject size; acquiring a second image frame at the second focus position; and determining a second sharpness of the subject within the second image frame. A sharpness threshold is determined as a function of image acquisition parameters for the first and/or second image frame. Responsive to the second sharpness not exceeding the first sharpness and the sharpness threshold, camera motion parameters and/or subject motion parameters for the second image frame are determined before performing a focus sweep to determine an optimal focus position for the subject.

13 Claims, 5 Drawing Sheets

(51) Int. Cl.
*G06T 5/00* (2006.01)
*G03B 13/00* (2006.01)
*G02B 7/36* (2006.01)

(52) U.S. Cl.
CPC ..... *H04N 5/23219* (2013.01); *H04N 5/23254* (2013.01); *G02B 7/36* (2013.01)

(58) Field of Classification Search
CPC . G06T 5/004; G06T 2207/10148; G02B 7/28; G02B 7/36; G03B 13/36; G03B 13/32; G03B 13/34
USPC .................. 348/345, 349–350, 352
See application file for complete search history.

(56) References Cited

U.S. PATENT DOCUMENTS

| | | | |
|---|---|---|---|
| 7,082,212 | B2 | 7/2006 | Liu et al. |
| 7,800,628 | B2 | 9/2010 | Harville et al. |
| 8,068,164 | B2* | 11/2011 | Kumagai ............... G03B 13/30 348/345 |
| 8,233,078 | B2* | 7/2012 | Chang ............... H04N 5/23212 250/201.4 |
| 8,797,448 | B2* | 8/2014 | Capata ............... G06K 9/00255 348/169 |
| 8,861,806 | B2* | 10/2014 | Steinberg ........... G06K 9/00228 382/103 |
| 8,970,770 | B2* | 3/2015 | Nanu ................ H04N 5/23219 348/345 |
| 9,743,001 | B1 | 8/2017 | Stec |
| 2005/0270410 | A1 | 12/2005 | Masahiro |
| 2007/0030381 | A1 | 2/2007 | Toshiaki |
| 2008/0252773 | A1 | 10/2008 | Hiroyuki |
| 2012/0044408 | A1 | 2/2012 | Futoshi |
| 2012/0257065 | A1 | 10/2012 | Verlarde et al. |
| 2012/0327293 | A1 | 12/2012 | Ollila et al. |
| 2013/0194375 | A1* | 8/2013 | Michrowski ........... H04N 7/147 348/14.07 |
| 2014/0028887 | A1 | 1/2014 | Azuma |
| 2015/0207985 | A1* | 7/2015 | Uemura ................. H04N 5/265 348/333.01 |
| 2015/0281553 | A1* | 10/2015 | Ogura ............... H04N 5/23212 348/348 |

FOREIGN PATENT DOCUMENTS

| | | |
|---|---|---|
| WO | 2008/018887 A1 | 2/2008 |
| WO | 2010/051147 A2 | 5/2010 |
| WO | 2012/041892 A1 | 4/2012 |
| WO | 2014/005783 A1 | 1/2014 |
| WO | 2014146983 A2 | 9/2014 |
| WO | 2016/000874 A1 | 1/2016 |
| WO | 2016/091545 A1 | 6/2016 |

OTHER PUBLICATIONS

International Search Report for PCT/EP2013/061611, dated Sep. 4, 2013, dated Sep. 16, 2013, 3 pages.
International Search Report for PCT/EP2015/061919, dated Jul. 24, 2015, dated Dec. 2, 2015, 4 pages.

* cited by examiner

IMAGE ACQUISITION DEVICE AND METHOD BASED ON A SHARPNESS MEASURE AND AN IMAGE ACQUISTION PARAMETER

FIELD OF THE INVENTION

The present invention relates to an image acquisition device and a method of acquiring an image.

BACKGROUND

Referring now to FIG. 1, a typical digital image acquisition device 10 or a camera module for an image acquisition device comprises a lens 12 connected to an image sensor 14 which generates image information when exposed through the lens 12. Acquired image information is fed downstream from the sensor 14 to an image correction stage 16 where the raw image information is corrected, for example, for color balancing or for distortion correction such as disclosed in WO 2014/005783, the disclosure of which is incorporated herein by reference. In FIG. 1, the image correction stage 16 is shown as a single block. However, it will be appreciated that this functionality can be implemented in many different ways either directly in an image processing pipeline connected to the sensor 14 or through processing image information stored in memory (not shown).

Acquired image information can be employed both for automatic exposure (AE) and automatic focus (AF) control 18. AE controls the timing 20 of the image sensor 14 to suitably expose captured images. AF automatically adjusts the lens 12 through its driver circuitry 22 to obtain focus on a subject at a given distance.

While some AF systems can either use separate contrast sensors within the camera to detect an optimal focus position (passive AF) or emit a signal to illuminate or estimate the distance to a subject before focusing at that distance (active AF), small multifunction devices such as mobile phones, tablet computers, personal digital assistants and portable music/video players, often do not include separate image and autofocus sensors and instead rely on acquired image information to perform autofocus.

Such multifunction devices typically use the focus driver 22 to successively set the position of the camera lens (or lens assembly) 12 to a specified number of lens positions or points of interest (POI) and evaluate focus (e.g., contrast) at one or more points in images acquired at each lens position to determine an optimal focus position—where maximum contrast is assumed to correspond to maximum sharpness or "best" focus.

Employing points distributed across an image to measure contrast and assess focus is typically referred to as contrast detection auto-focus (CDAF). CDAF has limited utility in that it does not necessarily prioritize focus on one portion of an image over another. Even if CDAF were only performed on a specified region of an image, it also suffers in low-light conditions where image contrast is low. On the other hand, approaches such as face detection auto-focus (FDAF), for example, as explained in WO2016/000874, the disclosure of which is incorporated herein by reference, involve identifying a face region within an image and, using anthropometric data such as the known distance between eyes of between 65-70 mm, to achieve focus and maximize the sharpness of the face region. Other forms of subject feature for which the typical dimensions are known, for example, a car, can also provide the basis for an auto-focus mechanism and the present specification applies equally to such subject features.

In any case, auto-focusing based face detection or face-equivalents can be quick by comparison to more traditional contrast based approaches and can also provide improved performance in low light conditions.

Nonetheless, whether using CDAF, FDAF or any equivalent scheme, performing a sweep through a number of POI to measure the sharpness of points in successive frames in a sequence with a view to determining which provides optimal focus can take some time and during this time, each acquired image being previewed before final image acquisition can appear blurred to a greater or lesser extent. This focus hunting process can be slow and visually unpleasant.

Some examples of methods which deal with images which include blurred features follow, "Facial Deblur Inference using Subspace Analysis for Recognition of Blurred Faces", Masashi Nishiyama et al (http://research-sry.microsoft.com/pubs/140476/Final%Version.pdf) discloses using information derived from a training set of blurred faces where blurred faces degraded by the same PSF are similar to one another to provide statistical models representing predefined PSF sets in a feature space. A query image may be deblurred using the PSF corresponding to that model so that the deblurred face might be recognized.

U.S. Pat. No. 8,797,448 discloses acquiring a scene including multiple features with a digital image acquisition device; identifying a first group of pixels that correspond to a first feature within the scene; adjusting an optic in real time to a first focus position to focus the device on the first feature; and capturing a first digital image at the first focus position. A second group of pixels that correspond to a second feature within approximately the same scene is identified; the optic is adjusted in real time to a second focus position to focus the device on the second feature; and a second digital image is captured at the second focus position. The first and second digital images including the first and second features are registered; and either stored, transmitted, combined, captured or displayed together.

WO2012/041892 discloses an autofocus method involving acquiring an image of a scene that includes one or more out of focus faces and/or partial faces. The method includes detecting one or more of the out of focus faces and/or partial faces within the digital image by applying one or more sets of classifiers trained on faces that are out of focus. One or more sizes of the one of more respective out of focus faces and/or partial faces is/are determined within the digital image. One or more respective depths is/are determined to the one or more out of focus faces and/or partial faces based on the one or more sizes of the one of more faces and/or partial faces within the digital image. One or more respective focus positions of the lens is/are adjusted to focus approximately at the determined one or more respective depths.

It will be appreciated that there are a number of factors, other than lens position, which can contribute to whether or not an acquired image appears sharp including: camera shake (hand motion, vehicle motion, etc.); and subject motion during the exposure time of an image. Also, it will be appreciated that any sharpness measure based on an image feature such as a face will be impacted by:

Face type (hair colour, amount of hair on the face, glasses, etc.);
Distance to the subject;
Ambient light type/level (ISO level/noise, etc.); or
Lens sharpness function model.

So while it can be possible to determine a lens POI providing a maximum contrast and so optimal focus for a feature such as a face, it is not possible to determine from an absolute contrast or sharpness measurement whether or not an image or image feature is in optimal focus.

As such, AF systems continue to suffer from focus hunting artifacts.

SUMMARY

According to the present invention there is provided a method of acquiring an image according to the claims.

In a second aspect, there is provided an image acquisition device according to the claims.

According to a third aspect, there is provided a computer program product according to the claims.

Embodiments provide a sharpness measure for an image region (e.g. face, eyes) based on image acquisition parameters and this measure can be employed to determine if a lens sweep which might improve focusing is required.

BRIEF DESCRIPTION OF THE DRAWINGS

An embodiment of the invention will now be described by way of example, with reference to the accompanying drawings, in which.

DESCRIPTION OF THE EMBODIMENT

Figure 1:
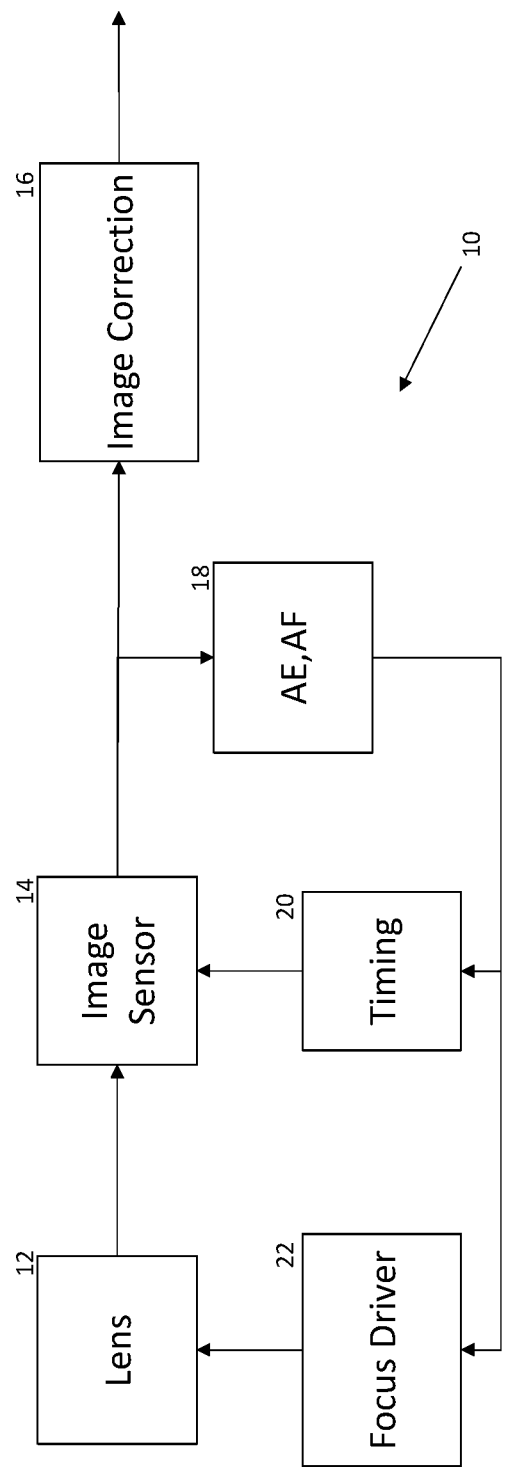
FIG. 1 shows schematically the components of a prior art image acquisition device.
Figure 2:
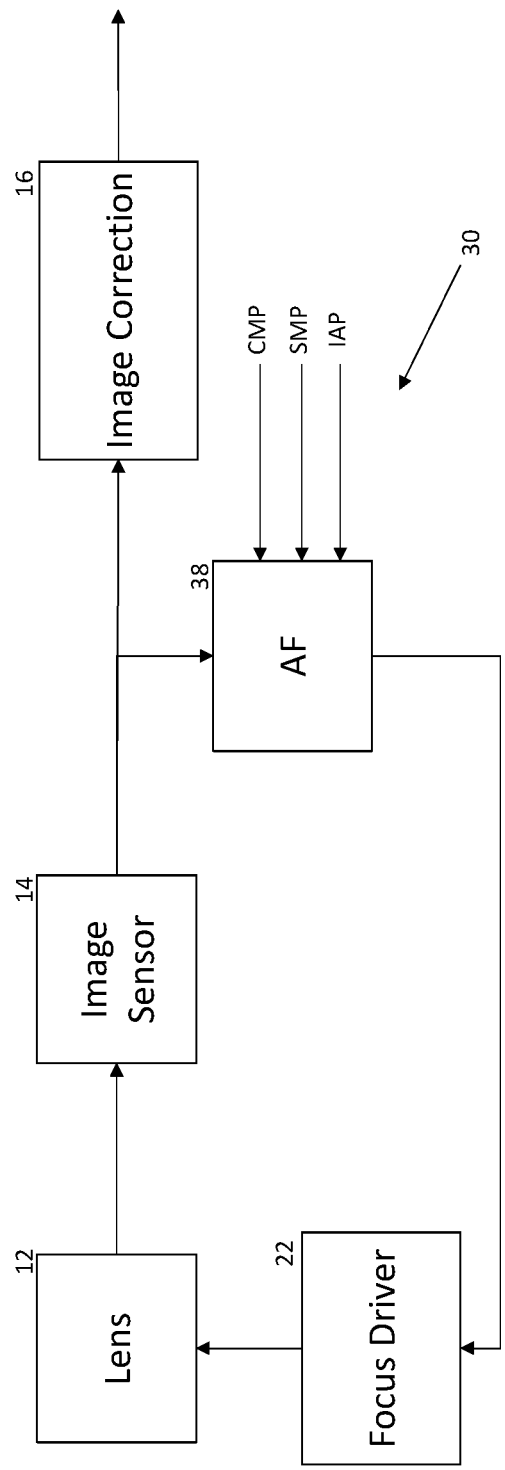
FIG. 2 shows schematically the relevant components of an image acquisition device according to an embodiment of the present invention.

Referring now to FIG. 2, an autofocus system 38 according to an embodiment of the present invention draws information from a number of sources within an image acquisition device 30 to determine if a focus sweep might be required. (Details of the AE system of FIG. 1 are omitted for clarity).

Figure 3:
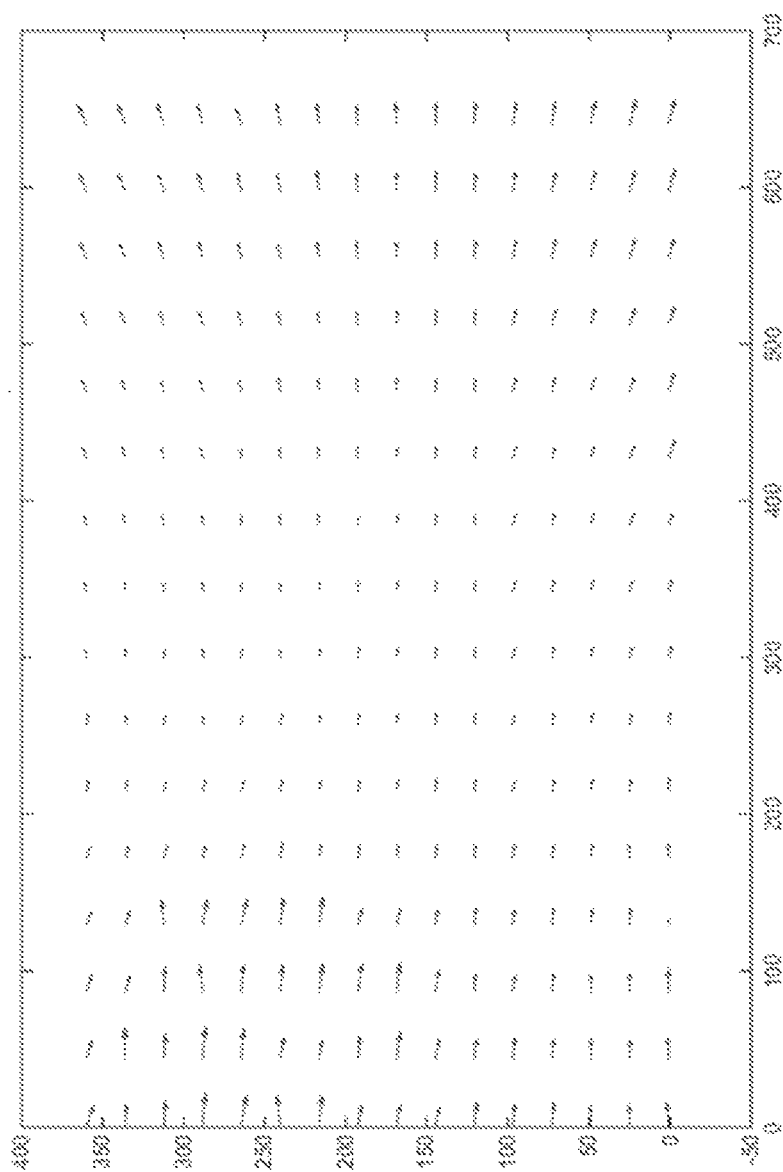
FIG. 3 shows a frame-to-frame displacement matrix of motion vectors employed in one embodiment of the present invention.

It is known to extract either intra-frame or frame-to-frame camera motion parameters (CMP), for example, to provide image stabilisation within a video sequence, as disclosed in U.S. application Ser. No. 15/048,149 filed 19 Feb. 2016 the disclosure of which is incorporated herein by reference. CMP can comprise a simple measure of camera inertial measurement unit (IMU) outputs from either accelerometers and/or gyroscopes indicating translational and rotational movement of the camera within a frame or from frame-to-frame. Alternatively, a displacement map, such as shown in FIG. 3, estimating the frame to frame motion between any given input frame N and a preceding (or succeeding) frame N−1 can be determined, for example, as disclosed in WO2014146983 the disclosure of which is incorporated herein by reference, as an indicator of camera frame-to-frame motion.

In any case, the AF system 38 acquires such CMP information from either from an IMU and/or any other processing modules (not shown) within the image acquisition device 30 to indicate intra-frame or frame-to-frame camera motion.

As well as camera motion, it is known for an acquisition device to detect and track a subject, for example, a detected face, through a sequence of acquired images, for example, as disclosed in WO2008/018887 and related cases, the disclosure of which is incorporated herein by reference. Thus, the AF system 38 of the embodiment can obtain either intra-frame or frame-to-frame subject motion parameters (SMP) i.e. x, y displacement parameters for a region of interest within an image comprising a subject being tracked either within frame N or between frame N and a preceding (or succeeding) frame N−1 from any processing modules (not shown) within the image acquisition device 30 performing such analysis.

Finally, the AF system 38 can extract image acquisition parameters (IAP) such as sensor gain, exposure time, light level, lens position (subject distance), etc. for any given frame.

Figure 4:
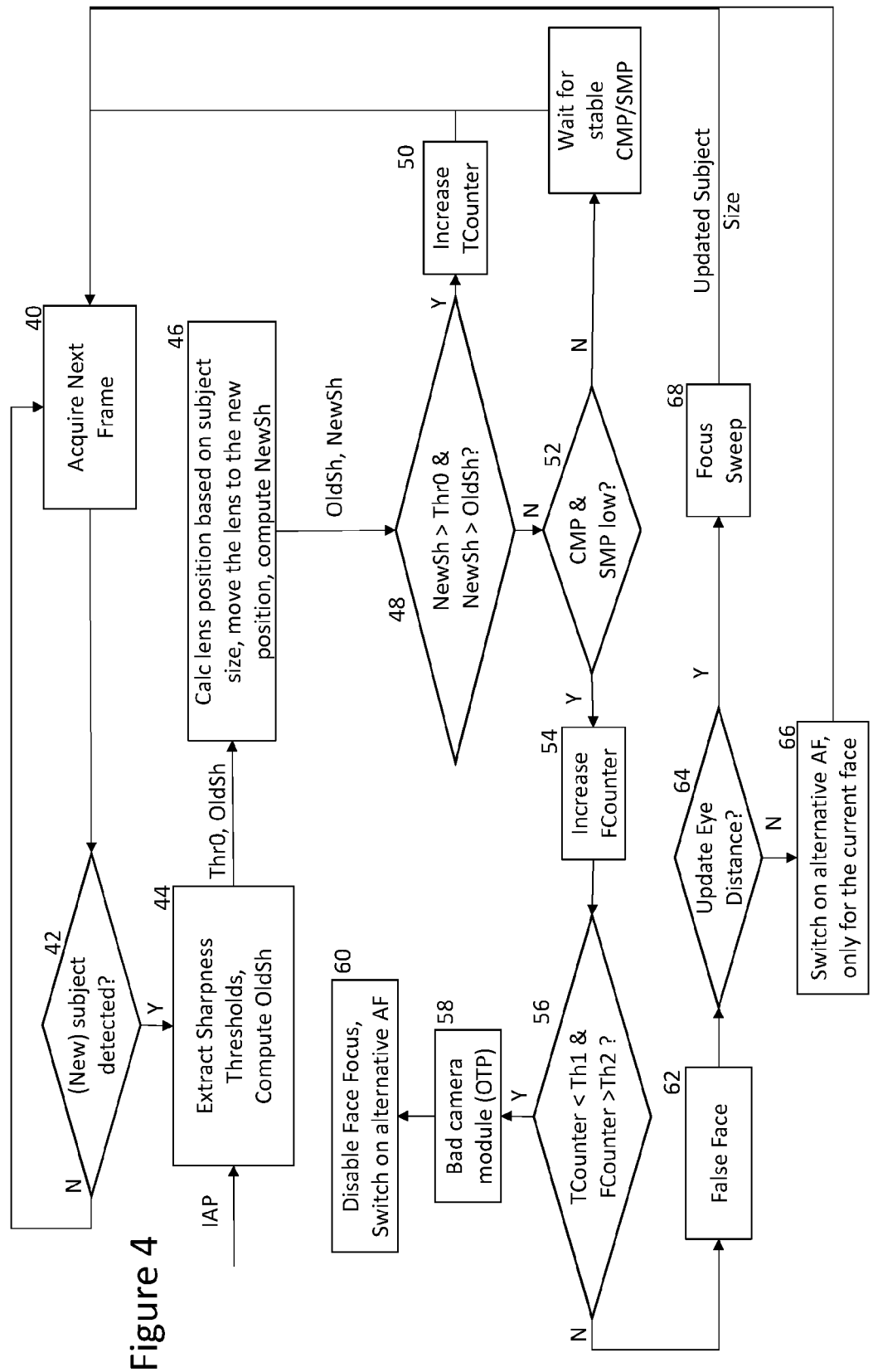
FIG. 4 illustrates a method for acquiring an image according to an embodiment of the present invention.

Referring now to FIG. 4, there is a shown a method for acquiring an image according to an embodiment of the present invention. The embodiment is based on the principle that it is advantageous, where possible, to operate in a FDAF or face-equivalent type mode, rather than a CDAF or similar AF mode in order to maintain focus on a desired region, for example, a face region, within an image. As mentioned, this is because FDAF can operate more quickly and performs better in low light conditions. However, it remains desirable only to perform a focus sweep as a last resort.

The method of FIG. 4 begins once an image is captured at step 40. At this stage, the camera may be either operating in FDAF mode or an alternative AF mode.

If the camera has been operating in FDAF mode, then a subject will have been tracked from a previous frame. Otherwise, the method checks to determine if a new subject has been detected and if this might be used for focusing. If a focus subject such as a face region is detected, step 42, the method continues, but if not, the next frame is acquired using an alternative AF mode and reverts to step 40.

At step 44, the method extracts sharpness thresholds as a function of IAP including distance to the detected subject; and ambient light level. Thus, for example, for a given distance to a subject and for a given light level, the method establishes a threshold level of sharpness against which a next acquired image will be assessed.

Figure 5:
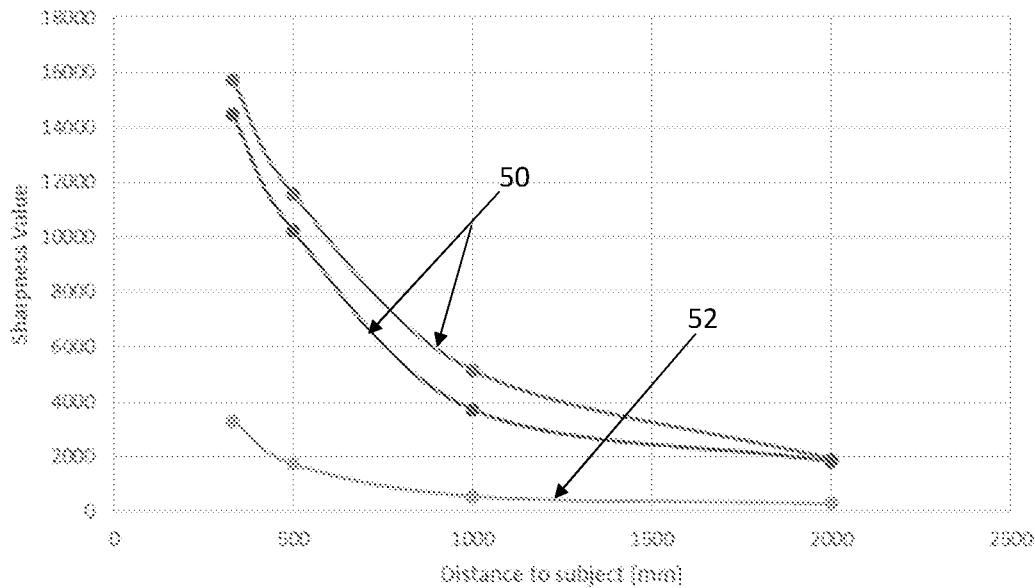
FIGS. 5 and 6 illustrate sharpness functions for different subjects at different distances and light levels respectively.

FIG. 5 includes a number of curves representing maximum sharpness values computed at different distances (330 mm, 500 mm, 1000 mm, 1500 mm, 2000 mm) to different subjects at a constant light level of 20 lux (and at a fixed exposure and ISO/gain level) for a typical camera. Curves 50 correspond to two different real faces, while curve 52 corresponds to a real size printed image.

Figure 6:
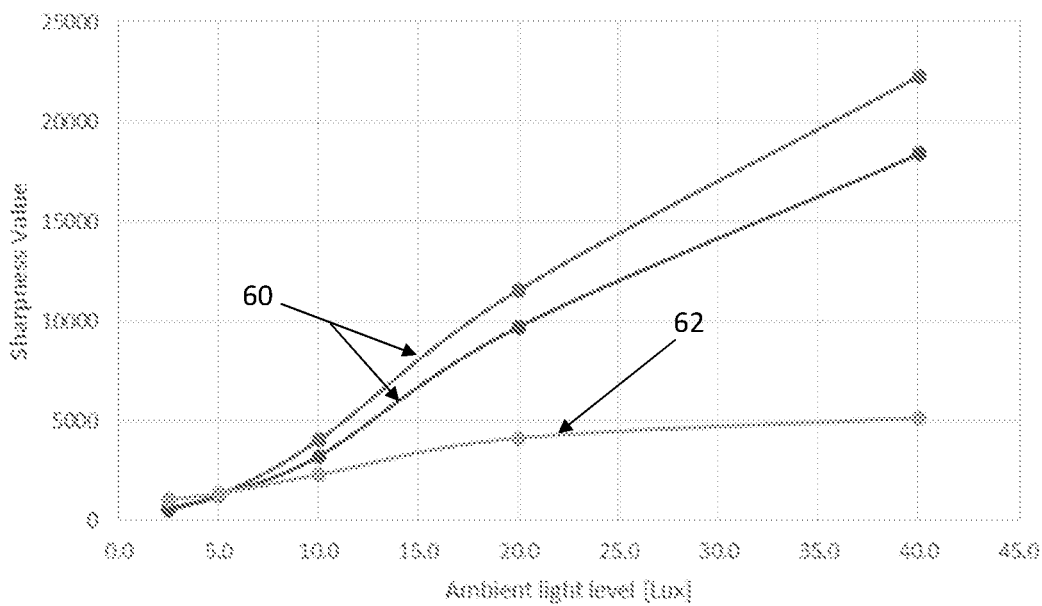

FIG. 6 on the other hand includes a number of curves representing maximum sharpness values computed at different ambient light levels at a fixed distance (500 mm) to the subject (and at a fixed exposure and ISO/gain level) for a typical camera. Again, curves 60 correspond to two different real faces, while curve 62 corresponds to a real size printed image.

It will be appreciated from FIGS. 5 and 6 that there is distance to a subject above which and a light level threshold below which the sharpness value become very small and noisy.

Multiple sets of curves such as shown in FIGS. 5 and 6 might be required to take into account variable ISO/gain levels and exposure times.

It will therefore be seen that when imaging a face at a given distance, light level, exposure time and given ISO/gain level, for a given camera, there is an expectation of the maximum sharpness which might be attained for a face region including a real face. In a simple implementation, this might comprise a simple average of the level of one of curves 50 and one of curves 60 for the subject distance and light level respectively at a given ISO/gain level and exposure time. Given the maximum value based on IAP used to acquire the present image, a sharpness threshold ThrO can be calculated as a fraction of the maximum value, e.g, 60%.

It will be appreciated that sharpness functions such as those shown in each of FIGS. 5 and 6 may need to be calculated and calibrated for any given lens assembly which might be employed within an image acquisition device or camera module. Ideally, these would be provided by a lens manufacturer and built into the lens but, in alternative implementations, although onerous, calibrating such functions may need to be performed by a manufacturer incorporating a lens into the device/module.

In any case the sharpness threshold ThrO for the given image can be a function of IAP including, but not limited to: light level, distance to the subject, ISO/gain, exposure time.

As well as calculating a sharpness threshold, in step 44 (see FIG. 4), a sharpness map OldSh, is calculated for the subject region detected within the image acquired at step 40. In a simple implementation, OldSh can comprise a small array or look-up table (LUT) with sharpness measurements for the subject region.

At step 46, based on the estimated distance to the subject, a new assumed-optimal lens position can be determined for example, as explained in PCT Application PCT/EP2015/076881, the disclosure of which is incorporated herein by reference. So for example, if a region of interest comprising a face is being tracked, then facial anthropometric data such as eye separation distance can be employed to determine, from the size of the imaged face and IAP, the distance of the subject from the image acquisition device.

The lens 12 can then be driven to the focus position (if a change is required) for this distance and a new frame acquired at that position. A sharpness map, NewSh, corresponding to the sharpness map, OldSh is then calculated for that frame.

At step 48, the new map NewSh for the frame is compared to the threshold level calculated at step 44 and compared to the map OldSh for the previous frame acquired at step 40. If the sharpness values for the new map exceed the threshold ThrO and its sharpness improves over the old map, then the focus position used at step 46 is regarded as valid.

There are of course many techniques for performing the comparisons of step 48, for example, that all or a given proportion or number of the sharpness values of NewSh must exceed ThrO and OldSh; or that the aggregate sharpness of NewSh must exceed that of OldSh and that a threshold new of points in NewSh must exceed ThrO.

In this case, the method proceeds to step 50 where a counter TCounter is incremented to signal how long a subject has been successfully tracked and the method continues to acquire a next frame at step 40.

On the other hand, if the adjustment at step 46 fails to improve the sharpness of the tracked subject, then the next step 52 is to assess camera motion (CMP) and subject motion (SMP).

If significant motion is measured in the scene (CMP and SMP are high), the loss of sharpness is attributed to motion rather than loss of focus, and the method continues by waiting for motion to stabilise and acquiring a next frame at step 40 (but without incrementing TCounter) before changing focus position.

Note that the thresholds for CMP and SMP can depend on the exposure time. When exposure time is long, smaller subject/camera motion levels are accepted. When the exposure time is very short (outdoor sunny scenarios), camera motion (hand held) can be neglected and larger subject motion (natural still motion) can be neglected, and only significant subject motion (fast sport actions) should be taken into account, i.e. the SMP threshold is inversely proportional to exposure time.

On the other hand, if, in spite of CMP and SMP being lower than their respective thresholds, sharpness has dropped, then the method proceeds to step 54 where a false counter FCounter is incremented.

At the next step 56, the method tests whether the number of false adjustments performed at step 46, in spite of low CMP/SMP, has exceeded a threshold, i.e., FCounter>Th2. If at this stage, TCounter is below a threshold, i.e. TCounter<Th1, the method infers that the camera has not been able to track a number (Th2) of subjects for sufficiently long indicating that the camera module may be malfunctioning—at least in respect of being able to perform FDAF. Thus, at step 58, the camera module is marked accordingly, and at step 60, FDAF can be permanently disabled and the camera switches to an alternative AF mode such as CDAF, i.e., the method of FIG. 4 will not be employed subsequently. As an alternative to permanently disabling FDAF, the user may be instructed to have the camera re-calibrated.

On the other hand, if the test at step 56 fails, it may mean that the subject being imaged does not in fact exhibit the assumed dimensions on which step 46 is based initially. For example, if the subject is a face and the face detected is a baby face or a large printed face, then the distance between the subject's eyes, a common anthropometric measure used to determine subject distance may not be the nominal 65-70 mm and so the focus position chosen based on this measurement would be incorrect—thus a false face is indicated at step 62. Similarly, if the subject being tracked were a car, then if a printed image of a car either in a magazine or on a billboard were being acquired by the image acquisition device 30, it would not exhibit the nominal dimensions associated with a car.

If a potentially valid updated nominal distance is not available, for example, if a focus sweep has already been performed for a given subject being tracked and should not be re-executed, the process stops without performing a (further) focus sweep and an alternative AF method is set for as long as the current subject region is being tracked (as well as resetting TCounter).

Otherwise, in step 68, the nominal anthropometric measure or dimension being used for the subject can be re-calculated as disclosed in PCT Application No. PCT/EP2015/076881, using a focus sweep to determine the focus position at which the subject exhibits maximum contrast and then re-calculating the nominal subject measurement at this distance. Note that this can be the only circumstance where a focus sweep is required. Indeed, if the method were not to attempt to track false faces (or equivalents), then focus sweep would not be required.

Where a focus sweep has been performed in order to determine an optimal focus position for a "false" subject, such as a printed image, the sharpness thresholds calculated and used in steps 44-48 can be adjusted accordingly i.e. as indicated in FIGS. 5 and 6, these may be lower than for a real subject.

Once an optimum focus position associated with an updated nominal size for the subject has been acquired, the method can now return to step 40 to continue as described above and to acquire a subsequent image at that focus position.

Now taking a specific example using the above method, at a given frame #1, a subject such as a face is detected/tracked. On this first frame, the AF position is as before, and the sharpness value (OldSh) is measured for the face region. Based on the distance between the eyes (measured in pixels on the detected face) the distance to the subject is estimated and then a new corresponding lens position is computed. The lens is moved to a new lens position based on this data from step. A new sharpness (NewSh) is computed for the face region in frame #2 acquired at the new lens position. The new sharpness from frame #2 is validated by comparing respective sharpness measurements for the face region in frame #1 and #2, when CMP and SMP are below the acceptable thresholds—the new sharpness from frame #2 should be higher or equal than the sharpness from frame #1. Based on these two measurements, the method decides if the focus position is good or not. If CMP and SMP are high, the method waits for stabilization.

If the new sharpness for frame #2 is not higher or equal than the sharpness for frame #1 and if the new sharpness value is not above a given threshold, the focus position is regarded as not acceptable. There may be reasons for this failure:

The detected face is not a real face (it could be a much smaller or a much larger printed face). In this case the method may need to switch to an alternative AF method e.g. CDAF; or The camera module has become bad (OTP data is invalid, start/stop DAC (digital-to-analog converter) codes for the lens actuator are not good) and the method should switch on an alternative AF method e.g. CDAF. If this failure is happening continuously (for more than Th2 different faces), then the module damage may be irreversible and the FDAF may be completely disabled.

The method of FIG. 4 has been provided for illustrative purposes and it will be appreciated that variants of this approach are possible. For example, the steps 40-46 can be integrated so that each iteration of the method involves acquiring only one new frame with sharpness measurements from the previous iteration being compared with sharpness measurements from a current iteration.

Equally the sharpness threshold ThrO could be calculated based on the IAP for the frame acquired at step 46 rather than the frame acquired at step 40; or indeed as a function of the IAP of both of these and possibly other successively acquired frames.

Also, information for more than one subject region within an image may be taken into account when assessing focus position.

As well as assisting in acquiring visible images, embodiments can be employed to acquire in-focus infra-red images of a human iris typically used for performing biometric identification and authentication of a device user.

The invention claimed is:

1. A method for acquiring an image in a digital image acquisition device or camera module of the type which includes processing circuitry which automatically provides digital image corrections, comprising:
    acquiring a first image frame including a region containing a subject at a first focus position;
    determining a first sharpness of said subject within said first image frame;
    identifying an imaged subject size within the first image frame;
    determining a second focus position based on said imaged subject size;
    acquiring a second image frame at said second focus position;
    determining a second sharpness of said subject within said second image frame;
    determining a sharpness threshold as a function of image acquisition parameters for the first and/or second image frame; and
    responsive to a condition in which said second sharpness does not exceed said first sharpness and does not exceed said sharpness threshold: determining values of camera motion parameters and/or subject motion parameters for said second image frame before, if at all, performing a focus sweep to determine an optimal focus position for said subject.

2. A method according to claim 1 wherein said subject comprises a face and wherein said imaged subject size is a distance in pixels between eye regions of said face.

3. A method according to claim 1 wherein said image acquisition parameters include at least light level for a scene being imaged and said focus position.

4. A method according to claim 3 wherein said image acquisition parameters further include ISO/sensor gain and exposure time.

5. A method according to claim 1 wherein said camera motion parameters and/or subject motion parameters comprise either intra-frame motion or frame-to-frame motion.

6. A method according to claim 1 further comprising: responsive to said camera motion parameters and/or subject motion parameters not exceeding respective motion thresholds, performing the focus sweep to determine said optimal focus position at which said subject region exhibits maximum contrast, and re-calculating a nominal subject size according to said optimal focus position for determining said second focus position.

7. A method according to claim 6 comprising incrementing a subject counter for each subject for which focus is not maintained for more than a threshold number of image frames before said second sharpness does not exceed said first sharpness and said sharpness threshold and said camera motion parameters and/or subject motion parameters do not exceed said respective motion thresholds and responsive to said subject counter not exceeding a threshold, switching to an alternative auto-focus method.

8. A method according to claim 6 comprising performing said focus sweep if focus for a subject is not maintained for more than a threshold number of image frames before said second sharpness does not exceed said first sharpness and said sharpness threshold and said camera motion parameters and/or subject motion parameters do not exceed respective motion thresholds.

9. A method according to claim 1 wherein each of said first and second sharpness comprise a map of sharpness measurements for said subject region.

10. A method according to claim 9 comprising comparing sharpness values from said second sharpness map with corresponding values from said first sharpness map and with said sharpness threshold.

11. A method according to claim 1 further comprising responsive to said second sharpness not exceeding said first sharpness or said sharpness threshold and said camera motion parameters or said subject motion parameters for said second image frame exceeding a respective motion threshold, acquiring a subsequent image frame before changing focus position.

12. An image acquisition device comprising an auto-focus module arranged to acquire image acquisition, subject motion and camera motion parameters for an acquired image frame; and to perform the method of claim 1.

13. A computer program product comprising a non-transitory, tangible computer readable medium on which computer executable instructions are stored which when executed on an image acquisition device are arranged to perform the method of claim 1.

\* \* \* \* \*